June 23, 1953     J. A. CRANFORD     2,643,285
APPARATUS FOR DETECTING DISCONTINUITIES IN WIRE
Filed Nov. 26, 1948
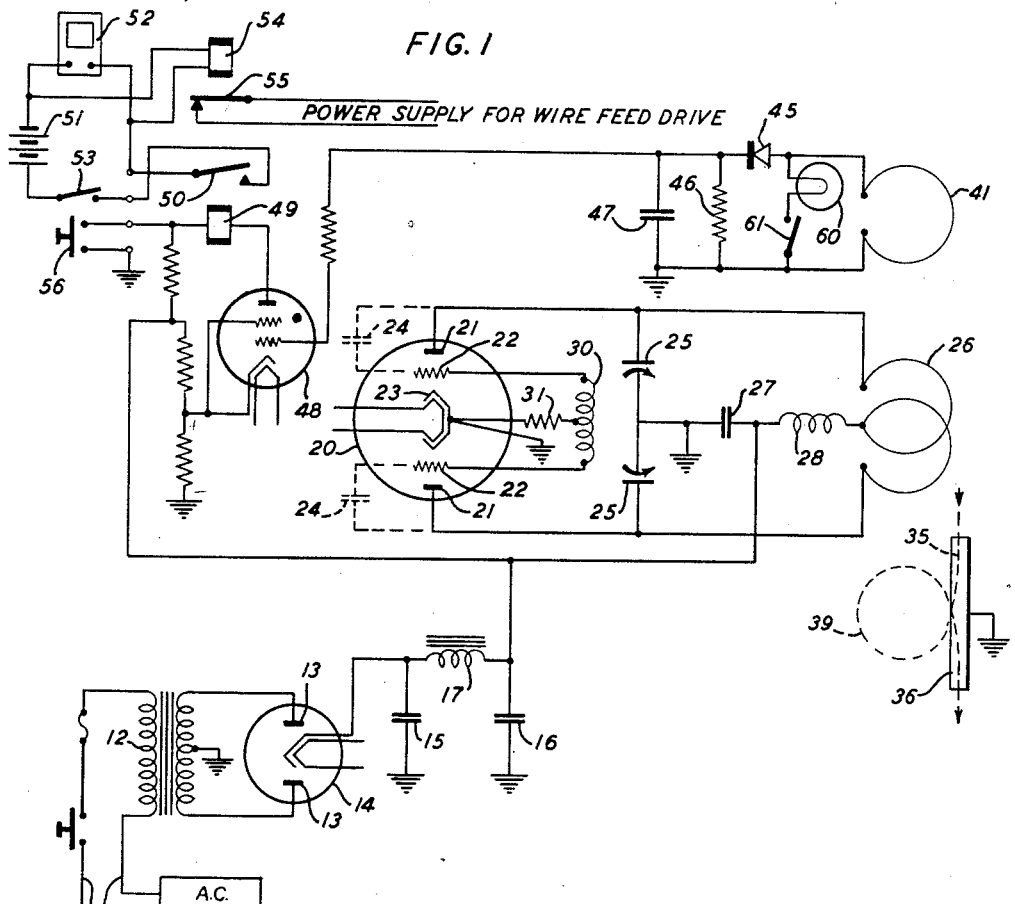
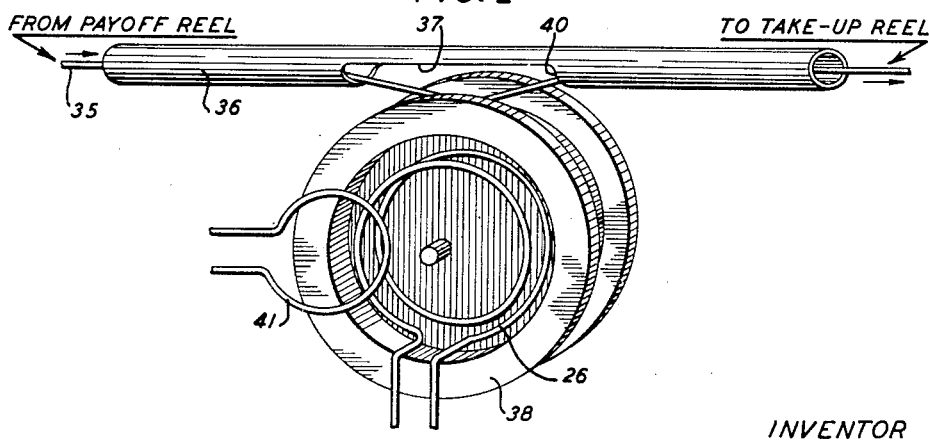
INVENTOR
J. A. CRANFORD
BY
ATTORNEY Patented June 23, 1953

2,643,285

UNITED STATES PATENT OFFICE 2,643,285

APPARATUS FOR DETECTING DISCONTINUITIES IN WIRE

Jesse A. Cranford, Buffalo, N. Y., assignor to Western Electric Company, Incorporated, New York, N. Y., a corporation of New York Application November 26, 1948, Serial No. 62,116

4 Claims. (Cl. 175—183)

This invention relates to devices for locating breaks in insulated wires and more particularly to a device of this type which operates automatically and requires a minimum of attention.

As a step in the manufacture of wire covered with insulation, it is customary to give each wire a test for continuity. This test is made by applying an electric potential across the two ends of the wire with indication of a current flow being evidence of continuity. If no current flows through the wire, the tester knows that there is a break somewhere along its length. One main problem that has been encountered in this type of test is to determine the location of the open circuit, once it has been found to exist. It is possible, of course, for the break in the wire to be at any point in its covered length, and the insulating cover prevents location of this break by direct vision.

It is therefore an object of this invention to provide a means for determining the exact location of a break found to exist in an insulated wire.

In one embodiment of the invention, this object is accomplished by feeding the wire known to contain a break, around a capstan so as to form a loop, which is effectively short circuited by an element which is capacity coupled to the wire, and grounded on both sides of the capstan. The loop is closely coupled to the output coil of an oscillator to suppress an alarm associated with a signal coil which is loosely coupled to the oscillator output. When the part of the wire containing the break passes around the capstan, the oscillator loading is shifted to the signal coil, causing the alarm to operate.

Other objects and features will be apparent from the following detailed description of the apparatus taken in conjunction with the attached drawing, in which:

Fig. 1 is a wiring diagram of the invention;

Fig. 2 is a perspective view of the capstan arrangement and the coupling of the coils.

With reference to Fig. 1, an A. C. voltage is brought in through leads 11 and impressed on a transformer 12, which has the midpoint of its secondary tapped and connected to ground. The alternating voltage is applied to two anodes 13 of a tube 14, which acts as a full wave rectifier tube. The pulsating D. C. thus obtained is smoothed by means of a filter circuit including condensers 15 and 16 and an inductance coil 17.

The rectified D. C. voltage is applied as the plate voltage of an oscillator circuit tube 20. The tube elements include two anodes 21, two grids 22, and a cathode 23, the cathode being connected to ground. The oscillator circuit is of the conventional tuned grid, tuned plate type, with the feed-back coupling between the plate and grid circuits being made through the inherent plate-grid tube capacitances represented by the dotted condensers 24.

The tank circuit for each oscillator plate circuit includes a condenser 25 and one half of a coupling coil 26, the coil being tapped at its midpoint. Connected in a mutual part of both plate circuits are a blocking condenser 27 and a choke coil 28.

The grid tuning circuit includes an inductance coil 30 and the inherent grid-cathode capacitances 24 of the tube 20. A grid bias resistor 31 is connected between the cathode 23 and the midpoint of the coil 30.

Referring now to Fig. 2 in conjunction with Fig. 1, a wire 35 to be tested is fed from a payoff reel, not shown, and passes through a grounded copper tube 36, the underside of which has an opening 37. As the wire reaches this opening, it passes out of the tube and around a non-conducting capstan 38, forming a coil 39 of a single turn. The wire reenters the tube at the point 40, and after passing through the remainder of the tube, is finally rewound on a take-up reel. The copper tube serves by means of capacity coupling to provide what is effectively a closed loop for A. C., in the circuit of the capstan coil 39.

Positioned in close proximity with the coil 39 of the wire to be tested is the coupling coil 26, connected in the tank circuits of the oscillator, and positioned in close proximity with the coil 26 is a coil 41, connected in a triggering circuit.

Referring back to Fig. 1, the triggering circuit in which the coil 41 is connected includes a copper oxide rectifier 45, a load resistor 46 and a filtering condenser 47. Also connected in the circuit in parallel with the coil 41 are an indicating lamp 60 and an indicating lamp switch 61. This circuit acts as the firing circuit for a gas filled trigger tube 48, the grid voltage of the tube being supplied from the load resistor 46. The gas filled tube is set to trigger at a grid voltage of approximately two volts or less, negative with respect to the cathode. The plate voltage of the tube is supplied by the rectifier tube 14, and in the plate circuit is connected a relay 49. When current flows in the tube plate circuit, an armature 50 of the relay 49 closes an alarm circuit including a battery 51, a buzzer alarm 52, and a switch 53. Connected in parallel with the alarm 52 is a relay 54, whose armature 55 normally closes a circuit supplying electric power to the wire feed drive (not shown). Push button 56 serves as a reset button for the thyratron tube.

The method of operation is as follows:

When a break has been found to exist in a given reel of wire, the reel is placed in position as the payoff reel in the setup of the present invention. The wire is fed around the capstan 38, forming the coil 39, and is then fed onward to the take-up reel.

The coil 39 of the wire to be tested is positioned so closely to the coil 26 of the oscillator tank circuit that there is a coupling between the two coils. In addition, the copper tubing acts as a capacity coupling element in conjunction with the coil 39 to give, in effect, a closed circuit for A. C. As a result, when the part of the tested wire passing over the capstan 38 is continuous, the major part of the power supplied by the oscillator is absorbed by the closed circuit of the coil 39.

The coil 41 of the triggering circuit of the gas filled tube 48 is also positioned close to the oscillator coil 26, but the design and spacing of the various coils is such that this coil 41 receives only a small part of the oscillator power when the wire around the capstan is continuous, the amount of power that is received under these circumstances being insufficient to fire the tube 48.

When there is a break in the wire 35, and this defect appears in the coil 39, formed over the capstan 38, the coil 39 no longer absorbs power from the oscillator coil 26 and sufficient oscillator power output is now transferred to the coil 41 to cause the voltage across the resistor 46 to trigger the gas filled tube 48. When this tube is fired, the current in its plate circuit causes the relay armature 50 to close the alarm circuit and sound the buzzer 52, thus indicating a break in the wire under test. The relay 54, which is connected in parallel with the buzzer is energized at the same time, causing its armature 55 to open the circuit supplying power to the wire feed drive and thereby stop the feeding of the wire.

The operator on learning of a break in the wire by the buzzer sound will first shut off the buzzer by opening the alarm circuit switch 53. The switch 61 is then closed, placing the indicating lamp 60 in the triggering circuit. Since the momentum of the wire speed will have carried the part of the wire containing the break a short distance past the capstan, the operator will feed the wire back at a greatly reduced speed, either mechanically or by hand. The indicating lamp 60 will glow when the broken part of the wire is again part of the coil around the capstan, the glowing being caused by the shift in the oscillator loading from the capstan coil to the triggering circuit coil 41. The exact location of the break can then be found by a physical examination of the wire in the capstan loop.

The speed with which it is possible to locate open circuits in insulated wire by means of this invention reduces the cost of this operation to a minimum. By the use of the buzzer alarm to give an audible signal whenever a break appears in the capstan loop, it is possible for one operator to handle several testing systems of this type, thereby further reducing the cost involved in the location of wire breaks.

The frequency chosen for the oscillator does not constitute any limitation on the principle of operation, but will have an effect on the physical characterisics of a system based on the invention. A frequency considered suitable from a practical standpoint is 50 megacycles. This frequency was chosen to reduce the size of the capacitive pickup elements while maintaining a suitably low impedance between them and the wire under test. The single turn inductance, formed by the wire under test, permitted a suitable inductive load at this approximate frequency. Additional reasons for the choice of this frequency were that it was thus possible to use small circuit elements and to use a standard commercial vacuum tube.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In apparatus for locating opens in insulated wire, a first coil, means energizing the first coil whereby said first coil carries alternating current, a second coil in loosely coupled inductive relation to the first coil, an alarm associated with the second coil, means for passing the wire to be tested in a looped path through the field of the first coil and means for reducing the impedance of the said looped path.

2. In apparatus for locating opens in insulated wire, a first coil, means energizing the first coil whereby said first coil carries alternating current, a second coil in loosely coupled inductive relation to the first coil, an alarm associated with the second coil, means for passing the wire to be tested in a looped path through the field of the first coil, and means for capacity coupling together the portions of the wire on opposite sides of the looped path.

3. In apparatus for locating opens in wires, an oscillator, an oscillator coil, a second coil loosely coupled to the oscillator coil, an alarm, means connecting the alarm to the second coil, a capstan in closely spaced relation to the oscillator coil and around which a moving wire to be tested may be passed to form a loop and a capacity coupling element adjacent to the capstan for short circuiting the successive looped portions of the wire to cause the loop to absorb power from the oscillator coil and thereby prevent operation of the alarm.

4. In apparatus for locating opens in wires, an oscillator, an oscillator coil, an alarm, an alarm circuit, a trigger tube, a relay located in the plate circuit of the trigger tube to make and break the alarm circuit, a triggering circuit for the trigger tube, said circuit including a rectifier and a resistor for supplying a trigger voltage, a second coil connected in the triggering circuit, said second coil being loosely coupled to the oscillator coil, and a capstan in closely spaced relation to the oscillator coil and around which a moving wire to be tested may be passed to form a loop and a capacity coupling element adjacent to the capstan for short circuiting the successive looped portion of the wire to cause the loop to absorb power from the oscillator coil and thereby prevent operation of the alarm.

JESSE A. CRANFORD.

References Cited in the file of this patent

UNITED STATES PATENTS

| Number | Name | Date |
| --- | --- | --- |
| 1,743,318 | Carrington | Jan. 14, 1930 |
| 2,031,016 | Taborsky | Feb. 18, 1936 |
| 2,217,843 | Langer | Oct. 15, 1940 |

FOREIGN PATENTS

| Number | Country | Date |
| --- | --- | --- |
| 367,928 | Great Britain | Mar. 3, 1932 |